United States Patent

[11] 3,576,452

[72] Inventor Lawrence R. Smith
Phoenix, Ariz.
[21] Appl. No. 732,677
[22] Filed May 28, 1968
[45] Patented Apr. 27, 1971
[73] Assignee Motorola, Inc.
Franklin Park, Ill.

[54] PHOTODIODE PREAMPLIFIER CIRCUIT FOR A CARD READER SYSTEM
7 Claims, 1 Drawing Fig.

[52] U.S. Cl. .......... 307/311, 250/219, 307/288, 330/20, 330/26, 330/59
[51] Int. Cl. .......... H03f 17/00, H03f 1/38, H03k 3/00
[50] Field of Search .......... 307/311, 288; 330/59, 925, 2 (E); 250/219, 219 (Idc); 328/2, 173

[56] References Cited

UNITED STATES PATENTS 3,436,553 4/1969 Bevis .......... 250/219

OTHER REFERENCES

I.B.M. Tech. Disclosure Bulletin, Document Dect. Reader by A. Cutaia et al. Vol. 6, No. 1 6/63 250/219 Page 71 copy in 250/219

I.B.M. Tech. Discl. Bulltn., Wide Response Amp. with Auto. Threshold Control by R. Braun Vol. 8 No. 4 9/65 page 690, copy in 307/311

I.B.M. Tech. Discl. Blltn., Optical Reader Device, J. Prot et al. Vol. 8 No. 11, 4/66 page 1666

*Primary Examiner*—Donald D. Forrer
*Assistant Examiner*—B. P. Davis
*Attorney*—Mueller, Aichele & Rauner

ABSTRACT: A photodiode preamplifier circuit including input terminals to which a photodiode may be connected. The photodiode senses the presence of a mark or a hole on a sense card and in turn provides a change in voltage at a control transistor to which the photodiode is connected. An output transistor is connected to the control transistor and is conductively controlled by the signal applied to the control transistor to in turn provide an output signal at one or the other of two binary levels. A reference level control means is connected between the control transistor and the input terminals of the amplifier and responds to current variations in the control transistor to produce a compensating current to the photodiode. This compensating current maintains a constant DC voltage level with reference to a constant threshold level at the output transistor.

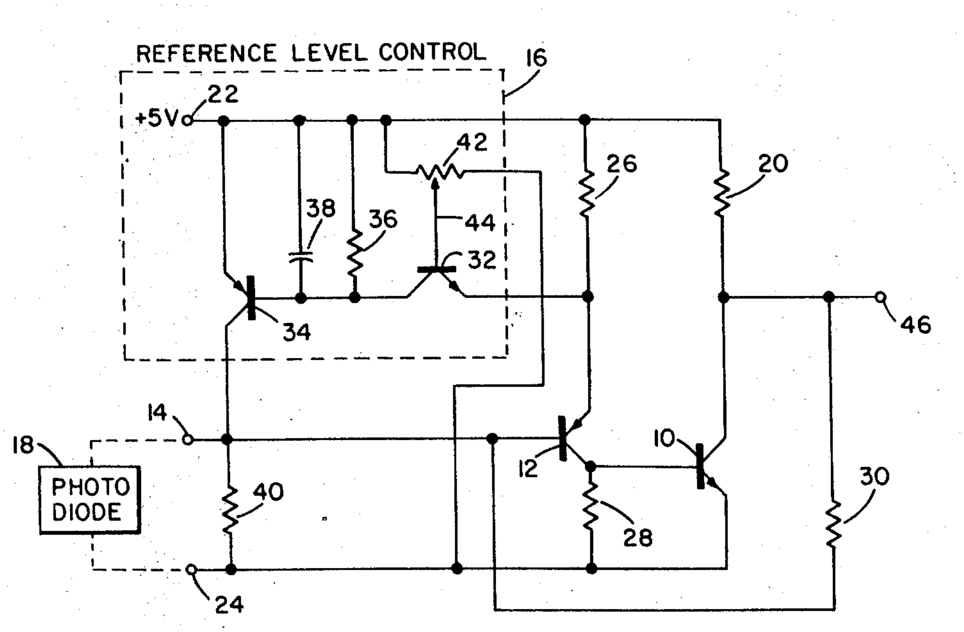
INVENTOR.
Lawrence R. Smith
BY
Mueller, Aichele & Rauner
ATTY'S.

PHOTODIODE PREAMPLIFIER CIRCUIT FOR A CARD READER SYSTEM

BACKGROUND OF THE INVENTION

This invention relates generally to transistor amplifier circuits and more particularly to a photodiode preamplifier circuit for an optical reader system.

Prior art photodiode preamplifier circuitry includes, for example, a resistor and a photodiode connected in a voltage divider arrangement so that the light-responsive photodiode undergoes a change in voltage in response to a hole or a mark on a sense card. Such change in voltage produces a corresponding change in output voltage of the amplifier to thus indicate the presence of a hole or a mark on a sense card. However, this type of prior art amplifier circuitry cannot compensate for changes in light reflected from the sense card as a result of imperfections in card material, diode sensitivity, temperature variations, or other system imperfections which cause the impedance of the photodiode to vary. Thus, in these prior art circuits, the DC level at the input of the amplifier will vary within certain limits, and such variation will be different from amplifier to amplifier within a given card reader system. Therefore, when the photodiodes age, for example, or become covered with dust, the amplifier has to be readjusted by either altering the voltage divider or otherwise altering the DC voltage level at some point in the amplifier circuit. The disadvantage of this requirement is obvious, especially in a system having many amplifier circuits which must be continually adjusted.

Another type of prior art photodiode amplifier circuit for reading holes and marks on sense cards uses AC coupling between the photodiode and the input of the amplifier circuit to eliminate the above-described undesirable variations in DC levels produced by the various parameters mentioned above. However, in this type of circuit the AC coupling capacitor charges to the average signal value, and consequently the output of the coupling capacitor changes during a card cycle. If the time constant of the AC coupling is reduced to effectively differentiate the signal produced by the diode (charges for each mark of the card so that all mark signals are equal) the amplitude out of the capacitor varies drastically with the size of marks and with the speed that the marks pass the diode.

SUMMARY OF THE INVENTION

An object of the present invention is to provide a new and improved photodiode preamplifier which does not require AC coupling.

Another object of the present invention is to provide a new and improved photodiode preamplifier which constantly changes to compensate for the change of the threshold level at the output device of the circuit. Thus, during the absence of a hole or mark on a sense card passing adjacent the photodiode, the input terminal of the circuit is constantly compensated toward a constant DC level. This DC level will be constant for any given temperature and the word "constant" as used herein means constant with respect to a given output PN junction voltage which itself is temperature dependent. However, as the output PN threshold voltage level varies with temperature, the input voltage at the input terminals will change and maintain a constant voltage difference between input terminals and the PN threshold voltage of the output device.

A feature of the present invention is the provision of reference level control circuitry connected between a control transistor of the preamplifier and the input terminal thereof. This control circuitry establishes a level with respect to the fixed threshold level of the amplifier. Since the threshold is fixed and equal for all photodiodes, a common reference level control can be used for all diodes of the card reader. The reference level control circuitry responds to changes in conductivity of a control transistor to maintain a constant DC voltage level at the input terminal of the amplifier for variations in light reflected from the sense card, variation in diode sensitivity or the like.

Another feature of the present invention is the provision of an output transistor which is DC coupled to the control transistor and is operative to provide a binary output signal indicative of the presence or absence of a hole or mark on a card sensed by the photodiode.

Another feature of the present invention is the provision of charge storage means connected between a voltage supply terminal and the input terminal of the amplifier. This charge storage means maintains constant photodiode current when the photodiode is sensing a hole or a mark on a sense card.

Another feature of the present invention is the provision of regenerative feedback means connected between the output terminal of the amplifier and the control transistor. This feedback means serves to increase the switching speeds of the output and control transistors and reduces the signal to noise level that would be required without feedback.

These and other objects and features of this invention will become more readily understood from the following description of the accompanying drawing.

IN THE DRAWING

The sole FIGURE in the accompanying drawing illustrates, in schematic diagram, the photodiode transistor amplifier circuit according to the present invention.

DESCRIPTION OF THE INVENTION

Briefly described, the amplifier circuit embodying the present invention includes control and output transistors serially connected between circuit input and output terminals, and these transistors are responsive to photodiode impedance changes to provide a binary output signal. Reference level control circuitry is connected between the control transistor and the input terminal and responds to undesirable changes in the conductivity of the photodiode to provide a compensating current to the photodiode. This compensating current maintains the DC voltage level at the input of the threshold amplifier transistor 10 substantially constant over wide ranges of light variations, sense card imperfections, changes in photodiode sensitivity and the like.

Referring to the drawing in detail, output and control transistors 10 and 12, respectively, are cascaded base-to-collector between an input terminal 14 and an output terminal 46. A collector load resistor 20 is connected between a voltage supply terminal 22 and the output terminal 46, and a feedback resistor 30 is connected between the output terminal 46 and the base or control electrode of the control transistor 12. Emitter and collector resistors 26 and 28 are connected as shown to the input and output electrodes of control transistor 12, and an input resistor 40 which is connected between input terminals 14 and 24 serves to equalize the diode 18 characteristics as well as to bias transistor 34 at a predetermined collector current where its $\beta$ (common emitter current gain) is high.

A photodiode 18 is connected between input terminals 14 and 24, and the photodiode 18 responds to variations in light impinging thereon to vary the voltage level at the control electrode of control transistor 12 and thereby change the binary level at the output terminal 46. The photodiode 18 exhibits a relatively low impedance in the absence of a mark or a hole on the sense card and exhibits a relatively high impedance in the present of the light-absorbing hole or mark.

Reference level control circuitry 16 includes first and second transistors 32 and 34 connected between the emitter or input electrode of control transistor 12 and the input terminal 13. A resistor 36 and a capacitor 38 are connected in parallel between the control electrode of transistor 34 and voltage supply terminal 22. The control electrode of transistor 32 is connected to a resistor 42 having a variable tap 44 thereon. The voltage control provided by variable tap 44 establishes the sensitivity of the circuit as will be described in further detail below.

OPERATION

In reading marks on a sense card it is essential that high sensitivity to light changes be available so that the type of marks on a card are not critical. This high sensitivity must not cause false information to be read. Consequently, it is necessary that, in the absence of a mark on a sense card, a reference output voltage level be established with reference to a fixed threshold. The difference between this reference level and the fixed threshold is inversely proportional to the sensitivity of the amplifier. Since high sensitivity is required, this difference should be small, and this means that the circuit becomes extremely sensitive to changes in the reference voltage. Consequently, the reference voltage must be established and maintained for each card since variations in cards, light intensity, etc., would otherwise produce outputs that could exceed the fixed threshold.

When a sense card enters the card reader of which the preamplifier according to this invention is a part, the card will reflect a given level of light to the photodiode 18. The photodiode 18 will now conduct current at a given level and exhibit a relatively low impedance in the absence of a hole or a mark in the sense card to absorb a portion of this reflected light. For some variations in card material, ambient light or diode sensitivity, the photodiode 18 will tend to conduct more or less current and exhibit a different impedance than that exhibited previously. However, in accordance with the present invention, the voltage level at the base of transistor 10 will be established at a fixed threshold level the instant the card enters the reader. This reference level stabilization is accomplished as follows: In the absence of a hole or mark on the sense card, the control transistor 12 is normally conducting; the base of output transistor 10 high, output transistor 10 is also conducting and the output terminal 46 is at the lower of its two binary voltage levels. That is, the voltage level at the output terminal 46 is equal to the collector-to-emitter voltage of output transistor 10. Suppose now that due to variations in card material, photodiode 18 becomes more conductive and pulls the DC voltage level at the input terminal 14 below the previously established value. This drop in DC voltage at the base of control transistor 12 tends to turn this transistor on harder and reduce the voltage on the emitter of transistor 32 in the reference level control circuit 16. This action biases transistor 32 into conduction, reduces the voltage at the base of transistor 34 and increases conduction in transistor 34. This causes transistor 34 to provide additional current to the photodiode 18 and pulls up the voltage at input terminal 14 to a level which is just sufficient to maintain the emitter of the control transistor 12 one diode offset below the potential at the base of transistor 32. This reference potential may typically range from 1 to 4 volts and establishes a voltage across resistor 26 that will produce conduction of transistor 32. Since the voltage across resistor 26 is proportional to the emitter current of control transistor 12 and since this emitter current *Ie* is related to the collector current *Ie* by the equation $$I_c = \frac{\beta}{1+\beta}(Ie)$$

the two currents *Ie* and *Ic* will be approximately equal for a high beta transistor 12. The collector current *Ic* produces a voltage across resistor 28 which is the fixed threshold referred to above (or the $V_{BE}$ offset threshold voltage of transistor 10). Consequently, the reference voltage at resistor 42 establishes a voltage at the base of transistor 10 which is just above the offset voltage of transistor 10 by the desired amount.

When a mark or hole passes under the photodiode 18, the impedance of the photodiode 18 will increase, and the voltage at the base of control transistor 12 will increase, reducing the current in transistor 12. When transistor 12 current reduces the base potential of output transistor 10 to a point insufficient to maintain the output transistor 10 conductive, the output terminal 46 swings toward the 5-volt level at supply terminal 22.

When the photodiode impedance is increased as it senses a hole or a mark in the sense card, the storage capacitor 38 will maintain a substantially constant photodiode current through transistor 34 and this discharge current assures a maximum voltage swing at the base of control transistor 12. The resistor 36 which is connected directly in parallel with capacitor 38 is included to compensate for cases of extremely high beta for transistor 34. It is necessary for the capacitor 38 to discharge because it is this discharging that maintains the voltage level at base of 10 as light intensity decreases or diode resistance increases. That is, if transistor 34 has a low beta (i.e., current gain), then the discharge of capacitor 38 is primarily into the base of transistor 34 as described above. However, if transistor 34 happens to be a very high beta transistor or if the light level at the photodiode 18 is extremely low, the capacitor 38 will not discharge fast enough after one card is sensed to be ready for the next card unless there is the resistor 36 in the circuit. In other words, the capacitor 38 must be partially discharged and ready for the next card to enter the reader after the previous card is sensed. The capacitor 38 will maintain the photodiode current during periods of marks along the length of the card sensed, and the time constant of the capacitor 38 and the resistance through which it discharges is sufficiently long to maintain a near-constant current into photodiode 18 for the slowest card speed and marking combination.

The feedback resistor 30 which is connected between the circuit output terminal 46 and the base of the control transistor 12 provides a regenerative feedback signal to the transistor 12 to rapidly turn on and off transistors 10 and 12. This positive feedback enhances circuit operation by decreasing switching times of transistors 12 and 10 to a minimum. This regeneration also assures that output will not bounce between on and off when signal is near threshold. Signal to noise is consequently improved by this regeneration.

Another important and novel feature of the present invention is the temperature compensation of the control transistor 12 by the first transistor 32 in reference level control circuitry 16. Since the emitter and collector currents of control transistor 12 are approximately equal, the voltage at the base of output transistor 10 will be established at a voltage referenced to its emitter. The emitter-base PN junction voltage of transistor 32 compensates for the offset emitter base PN junction voltage of transistor 10 to maintain the voltage at the base of transistor 10 constant in the absence of a mark. As the threshold voltage established by the PN junction of transistor 10 decreases with temperature, a nearly equal decrease in the PN junction voltage of transistor 32 will occur. The current in the emitter of transistor 12 will consequently decrease, thus decreasing the voltage at the base of transistor 10 and compensating for this threshold voltage change. Since the temperature variations will produce a change of approximately 2 millivolts per degree centigrade in PN junction voltages the above temperature compensation feature is very important to the operation of the circuit over wide temperature extremes. The circuit illustrated and described has been operated satisfactorily from −55° C. to +92° C. with negligible change in sensitivity.

Thus, the photodiode preamplifier circuit described above is operative to detect light intensity variations such as pencil marks on a sense card as a card passes adjacent or under the photodiode. At the same time, however, the amplifier circuit rejects light variations which are not readily controlled, e.g., variations of ambient light, variations in card reflectivity, variations in photodiode sensitivity within manufacturing tolerances, aging or ambient temperature variations, variations of light because of light bulb aging, dust, etc.

Values for circuit components used in a circuit of the type described above are listed in the table below. This circuit has been built and successfully operated.

| Component | Value |
|---|---|
| Resistors (R): | |
| R20 | Ohms 1,000 |
| R28 | Ohms 2,200 |
| R30 | Ohms 2,200,000 |
| R26 | Ohms 2,700 |
| R46 | Ohms 2, 200 |
| R40 | Ohms 470 |
| Capacitor: | |
| C38 | microfarads 47 |
| Supply voltage | volts 5 |
| Potentiometer 42 voltage | volts 3 to 5 |
| Transistors: | Type |
| 12 and 34 | PNP |
| 10 and 32 | NPN |

The above table should not be construed as limiting the scope of this invention, and said invention is limited only by the way of the following appended claims.

I claim:

1. An amplifier circuit including, in combination:

an output transistor connected between a voltage supply terminal and a point of reference potential, said output transistor having an output terminal thereof which exists at one or the other of two binary levels to indicate the presence or absence of a hole or mark on a sense card, a control transistor connected between said output transistor and an input terminal, said control transistor responsive to a change in input voltage at said input terminal to change the conductive state of said output transistor, and reference level control means connected between one electrode of said control transistor and said input terminal and responsive to a change in voltage at said one electrode of said control transistor for producing an offsetting change in voltage at said control transistor; said offsetting change in voltage maintaining a substantially constant current through said control transistor and thereby maintains a constant DC voltage level at said input terminal with respect to a threshold voltage level of said output transistor.

2. The amplifier defined in claim 1 which further includes feedback means interconnecting the output of said output transistor to the input of said control transistor and providing a regenerative feedback signal to said control transistor for rapidly changing the conductive state of said control and output transistors.

3. The amplifier defined in claim 1 wherein said reference level control means includes:

a first transistor interconnected between a reference voltage and said control transistor, the conductive level of said first transistor being controlled by the conductivity of said control transistor, and a second transistor connected between said first transistor and said input terminal and responsive to changes in the conductivity of said first transistor for stabilizing the voltage level at said input terminal.

4. The amplifier defined in claim 3 wherein said reference level control means further includes a capacitor connected to said second transistor for providing a current to a photodiode connected to said input terminal when the impedance of said photodiode is increased as a result of said photodiode sensing a hole or a mark on a sense card, said current from said capacitor producing a desired voltage swing at said control transistor to turn off said control and output transistors and produce a high binary voltage level at said output terminal.

5. The amplifier defined in claim 4 which further includes a resistor connected in parallel with said capacitor between two electrodes of said second transistor for providing a leakage path for said capacitor.

6. The amplifier circuit defined in claim 5 which further includes:

a first resistor connected between said voltage supply terminal and the output electrode of said output transistor for producing voltage swings at said output terminal in accordance with the current into said output transistor, regenerative feedback means including a second, feedback resistor connected between said output electrode of said output transistor and the control electrode of said control transistor for providing a regenerative feedback signal to said control electrode of said control transistor, a third resistor connected between the output electrode of said control transistor and a point of reference potential and developing thereacross a voltage level which controls conductivity of said output transistor, a fourth resistor connected between the input electrode of said control transistor and said voltage supply terminal, the current through said fourth resistor controlling the conductivity of said first transistor in said reference level control means, and a fifth resistor connected between the control electrode of said control transistor at a point of reference potential, said fifth resistor providing a desired level of input impedance for said amplifier circuitry.

7. An amplifier defined in claim 6 wherein:

said first transistor in said reference level control means has the control electrode connected to a variable reference potential for controlling the conductivity of said reference level control means and for controlling the sensitivity of said amplifier, the input and output electrode of said first transistor connected in series between the input electrode of said control transistor and the control electrode of said second transistor, and said second transistor having the input and output electrodes thereof connected in series between said voltage supply terminal and said input terminal and conducting current to said input terminal and through a photodiode which is connected to said input terminal.